United States Patent [19]

Nishikawa et al.

[11] Patent Number: 5,179,291

[45] Date of Patent: Jan. 12, 1993

[54] ACCESS UNIT FOR LOCAL AREA NETWORK

[75] Inventors: Toshiyuki Nishikawa; Hiroshi Ishihara, both of Hyogo, Japan

[73] Assignee: Mitsubishi Cable Industries, Ltd., Hyogo, Japan

[21] Appl. No.: 591,813

[22] Filed: Oct. 2, 1990

[30] Foreign Application Priority Data

Oct. 6, 1989 [JP] Japan .................................. 1-262744

[51] Int. Cl.$^5$ ............................................. H04J 3/02
[52] U.S. Cl. .............................. 307/139; 340/825.05; 340/825.18; 370/85.15
[58] Field of Search ................ 307/125, 128, 139, 112, 307/115, 96, 97, 98, 99; 361/271, 280, 281; 370/56, 85.12, 85.15, 85.5; 340/825.05, 825.5, 825.18, 310 R, 310 A, 310 CP

[56] References Cited

U.S. PATENT DOCUMENTS

| | | | |
|---|---|---|---|
| 4,567,482 | 1/1986 | Dolsen et al. | 340/825.05 |
| 4,701,630 | 10/1987 | Annunziata et al. | 307/112 |
| 4,862,158 | 8/1989 | Keller et al. | 340/825.05 |
| 4,905,230 | 2/1990 | Madge et al. | 370/85.5 |
| 5,034,738 | 7/1991 | Ishihara et al. | 340/825.05 |

Primary Examiner—A. D. Pellinen
Assistant Examiner—Richard Elms
Attorney, Agent, or Firm—Birch, Stewart, Kolasch & Birch

[57] ABSTRACT

An access unit for a local area network with loop topology includes a pair of connectors, a relay circuit, a pair of transformers, a direct current signal extraction circuit, a constant current circuit, a controller, and a coil. With the above arrangement, when a workstation connected to the access unit generates a composite signal having a DC signal, used for driving the relay circuit, superposed onto an AC signal for data transfer, only the DC signal component is extracted by the direct current signal extraction circuit to be inputted into the controller of the access unit. The relay circuit of the access unit is then operated. Thus, the signal outputted from the workstation, the composite signal having the DC signal superposed on the AC signal, is applied to the concentrator, so that the DC signal contained within the composite signal activates the relay contact in the concentrator. The DC signal superposed on the AC signal is outputted from the workstation and accordingly activates both the relay contact in the access unit and the relay contact connected thereto in the concentrator.

1 Claim, 4 Drawing Sheets

ACCESS UNIT FOR LOCAL AREA NETWORK

BACKGROUND OF THE INVENTION

1. Field of the Invention

The present invention relates to an access unit for a local area network (LAN) and, more particularly, to such an access unit used for connecting a plurality of workstations by branching one connector in a concentrator to provide a switching operation to add the workstations in the local area network through a loop topology.

2. Description of the Background Art

In a conventional local area network with loop topology, a concentrator is used for providing a switching operation to add a plurality of workstations. Each of the plurality of workstations are wired from the concentrator provided in a wiring room, so that the plurality of workstations are wired loop-like via the concentrator.

However, the number of connectors in the concentrator for connecting the workstations is limited in the above-described local area network. It is difficult to add workstations beyond the number of the connectors. It is, therefore, difficult to expand the network.

Conventionally, to meet with a request of expansion, an access unit as shown in FIG. 4 is used. An access unit (a) of FIG. 4 is a sort of branching device connected to one connector of a concentrator (b). Through the access unit (a), a plurality (three, in this example) of workstations $ws_1$ to $ws_3$ are connected. Using the access unit (a), it is possible to connect one cable (c) only to the concentrator (b) even when a plurality of workstations $ws_1$ to $ws_3$ are provided. It is not necessary to individually wire the workstations $ws_1$ to $ws_3$ to the concentrator (b). It is possible to expand the network.

Meanwhile, to construct a local area network with loop topology by connecting the workstations $ws_1$ to $ws_3$, the access unit (a) and the concentrator (b), to each other as shown in FIG. 4, a relay in the access unit (a) must be turned on when each of the workstations $ws_1$ to $ws_3$ are connected to each connector of the access unit (a) and a relay in the concentrator (b) must be turned on when the access unit (a) is connected to one connector in the concentrator (b). Thus, the relays must be turned on at the two stages from the view of the workstations $ws_1$ to $ws_3$ connected to the access unit (a).

Therefore, conventionally, the relay in the concentrator (b) and the relay in the access unit (a) are individually operated. See, for example, Japanese Patent Unexamined Publication No. 63-284945. That is, the relay of the concentrator (b) is operated in response to direct current from the workstations $ws_4$ to $ws_5$, or the access unit (a), while the relay of the access unit (a) is operated by power from a power line (l) specific to workstations $ws_1$ to $ws_3$, in addition to the cable (c) for transferring the data.

However, for the above construction, the additional power line (l) is needed to connect the access unit (a) to the workstations $ws_1$ to $ws_3$. The wiring becomes complex unlike the cable construction of connecting the access unit (a) and the workstations $ws_4$ and $ws_5$ to the concentrator (b). Basically, the normal standard data connector cannot be used, which is very inconvenient.

On the contrary, it may be proposed that as the output signals from the workstations, a DC signal is superposed as an offset on an AC signal which transfers the data, so that both relays are operated by the DC signal.

In the case where the DC signal outputted from the workstations operates both relays, an input resistance from the side of the workstations is different than the case in which the DC signal outputted from one workstation is forwarded to the subsequent-stage workstation and the case in which the DC signal outputted from one workstation is forwarded to the concentrator, so that the voltage level of the DC signal is varied.

Further, since each workstation detects the breaking of the connecting wire and the short circuit by detecting the voltage level of the DC signal outputted therefrom the workstation may determine the occurrence of a problem even when actual trouble does not occur if the voltage level of the DC signal is varied by turning the relays on or off which is inconvenient.

SUMMARY OF THE INVENTION

With the foregoing in mind, it is an object of the present invention to provide an improved wiring construction of a local area network and an access unit by connecting a concentrator, the access unit, and a plurality of workstations with a common cable construction and connectors.

Briefly described, in accordance with the present invention, an access unit of the present invention includes. a relay circuit including a connector means connected to one workstation; relay contact for switching the connection of the connector either to a circuit, in which the connector is connected to the workstation so as to include the workstation, or to another circuit, in which the connector is not connected to the workstation so as not to include the workstation; and a driver for driving the relay contact. Also included are a pair of transformers provided between the relay circuit and the workstation; a direct current signal extraction circuit provided between the workstation and a primary winding of one of the pair of transformers, for extracting a direct current signal superposed on a signal outputted from the workstation; and a constant current circuit for generating a constant DC signal from the direct current signal and for superposing the constant signal on an AC signal generated from a secondary winding of the one of the pair of transformers. The access unit further includes a controller, which in accordance with the presence and absence of the DC signal extracted by the direct current signal extraction circuit, respectively generates and outputs a set signal and a reset signal; condenser means, coupled to the relay circuit and the direct current extraction circuit and being charged with the DC signal extracted by the direct current signal extraction circuit for discharging the direct current to activate the relay driver in accordance with the set and reset signals; and coil means, coupled between the connector and the primary winding of the other of the pair of transformers, for excluding the DC signal.

With the above arrangement, when the workstation connected to the access unit generates the DC signal used for driving the relay circuit which is superposed onto the AC signal for data transfer, the DC signal component is extracted by the direct current signal extraction circuit to be inputted into the controller of the access unit, so that the relay circuit is operated. Further, the DC signal extracted by the direct current signal extraction circuit is superposed again on an AC signal outputted from the secondary winding of the one of the pair of transformers the constant current circuit. The thus superposed signal is forwarded from the access unit to the concentrator through the relay circuit.

Therefore, similar to the signal outputted from the workstation, the DC signal superposed on the AC signal is applied to the concentrator, so that the DC signal contained within the superposed signal activates the relay contact in the concentrator.

Thus, the DC signal superposed on the AC signal, outputted from the workstation activates both the relay contact in the access unit and the relay contact connected thereto in the concentrator. Therefore, the workstations and the access unit can be connected with a normal data connector and it becomes unnecessary to provide a power line specific to operating the relay contact in the access unit. Thus, any inconvenience of using a non-standard connector and any trouble in wiring can be eliminated, with the total system becoming compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
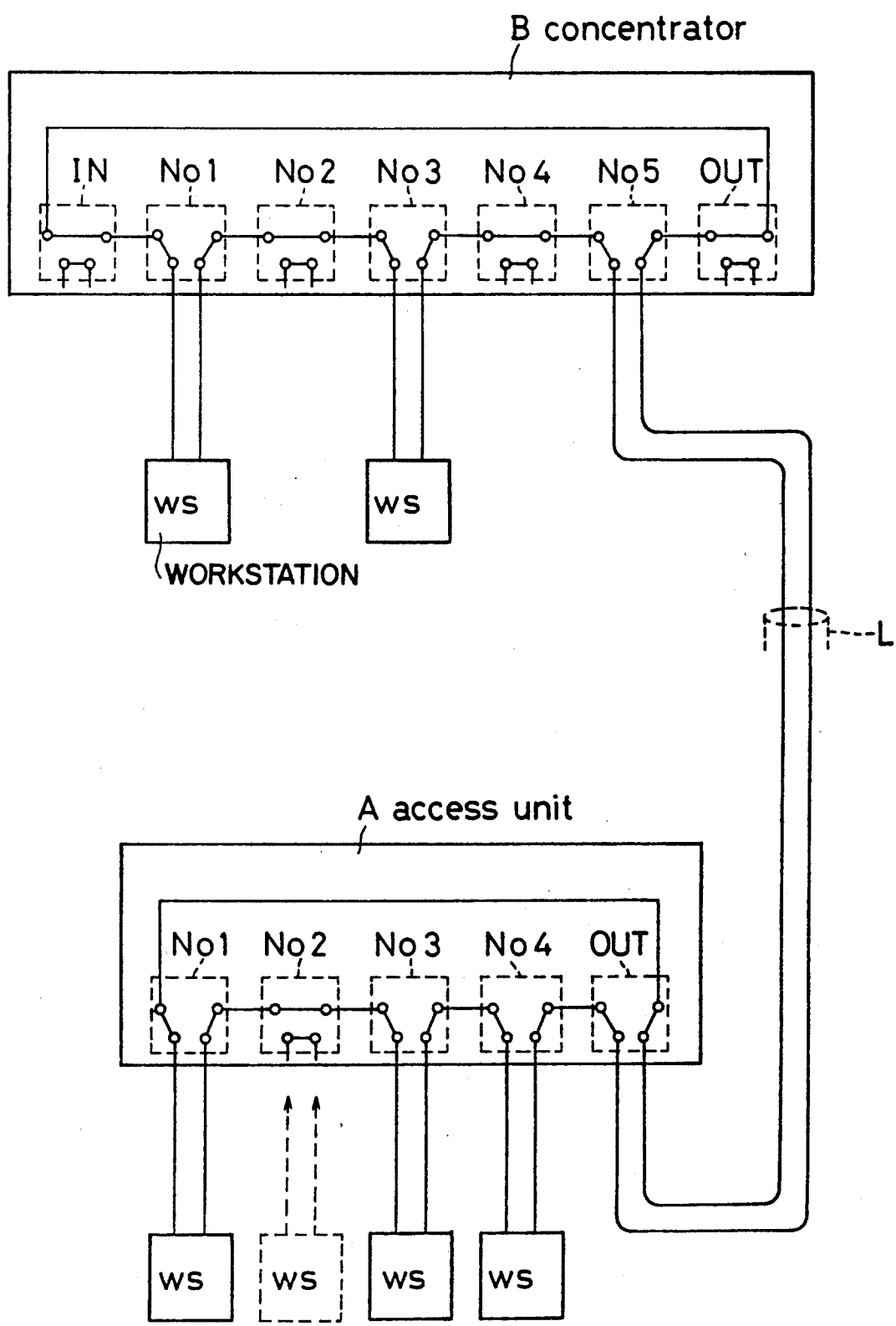
FIG. 1 illustrates a system of a local area network with loop topology using an access unit of the present invention.

FIG. 1 shows a local area network with loop topology according to the present invention. There are provided workstations ws, an access unit A, and a concentrator B. Each of the workstations ws output a composite signal formed of an AC data signal and a DC signal for driving a relay circuit. The access unit A comprises a plurality of (four in this preferred embodiment) connectors No. 1 to No. 4 for coupling the workstations ws, and a single connector OUT for coupling the concentrator B. The concentrator B comprises a plurality of (five in this preferred embodiment) connectors No. 1 to No. 5 for coupling the workstations ws, and an input connector IN and an output connector OUT for coupling another concentrator. Some connectors (No. 1, No. 3, and No. 4 in this preferred embodiment) in the access unit A and some connectors (No. 1 and No. 3 in this preferred embodiment) in the concentrator B are each provided with a corresponding workstation ws coupled thereto. The connector OUT in the access unit A and one connector (No. 5 in this preferred embodiment) in the concentrator B are coupled to each other via cable L. Thus, the local area network with loop topology is constructed.

Figure 2:
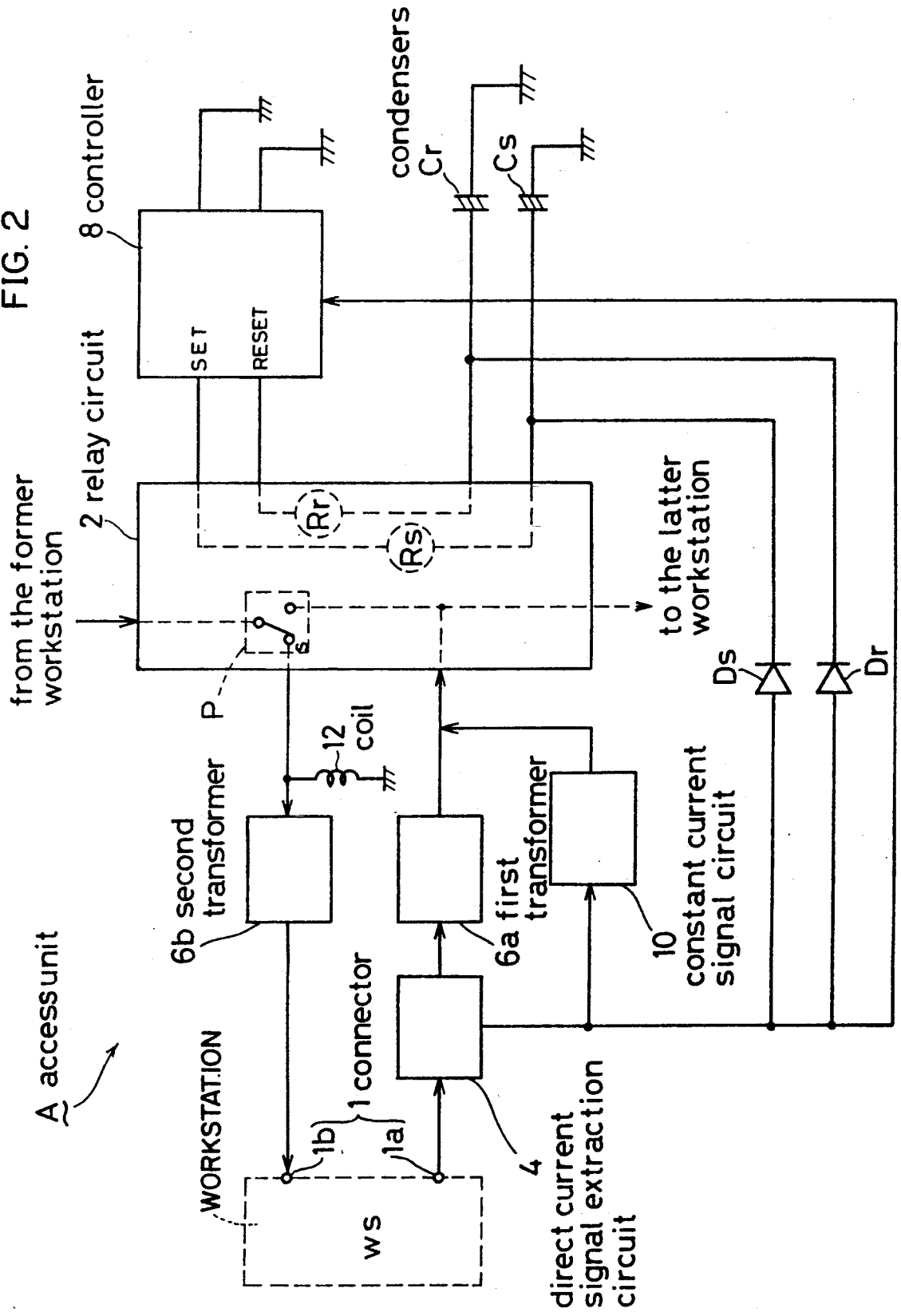
FIG. 2 illustrates a circuit for connecting workstations in the access unit so as to individually correspond to each connector.

FIG. 2 shows a circuit within the access unit A which couples the workstations ws respectively to a corresponding are of the connectors No. 1 to No. 4. In FIG. 2, there is provided a connector 1 to which one workstation ws is coupled. The connector 1 represents the connectors No. 1 to No. 4 in FIG. 1. The connector 1 includes an input terminal 1a for inputting the composite signal output from the workstation ws and an output terminal 1b for outputting an output. A latch-type relay circuit 2 is provided comprising a contact P for switching to the side of the connector 1 or the line side, a set coil Rs for setting the contact P, and a reset coil Rr for resetting the contact P. Between the relay circuit 2 and the connector 1, a direct current signal extraction circuit 4 is provided for extracting a DC signal from the superposed signal comprised of the AC data signal and the DC signal, the superposed signal being outputted from the workstation ws connected to the connector 1, and first and second transformers 6a and 6b are provided for extracting the AC data signal from the superposed signal. A controller 8 is provided for generating a set/reset signal to the relay circuit 2 according to the presence or absence of the DC signal to be extracted by the direct current signal extraction circuit 4. A respective terminal of both the set coil Rs and the reset coil Rr are connected to the controller 8.

Condensers Cs and Cr, which are charged with the DC signal extracted by the direct current signal extraction circuit 4, are connected to the other respective terminals of the set coil Rs and the reset coil Rr. The controller 8 contains a CR time constant circuit controlling a suitable time for sufficiently charging the condensers Cs and Cr. A constant current signal circuit 10 is provided for making the DC signal extracted by the direct current signal extraction circuit 4 constant to superpose the constant current on an AC signal outputted to the relay circuit 2 from the secondary winding of the first transformer 6a. The purpose of providing the constant current signal circuit 10 is to make an input resistance constant from the side of the workstation ws regardless of the case where the DC signal within the superposed signal from the workstation ws is forwarded to the following-stage workstation ws or the concentrator B. A coil 12 is connected between the relay circuit 2 and the primary winding of the second transformer 6b. When the DC signal within the superposed signal from the access unit A is passed through the concentrator B and then returned to the access unit A, the coil 12 excludes the DC signal. Diodes Ds and Dr are provided for preventing reverse current flow.

Figure 3:
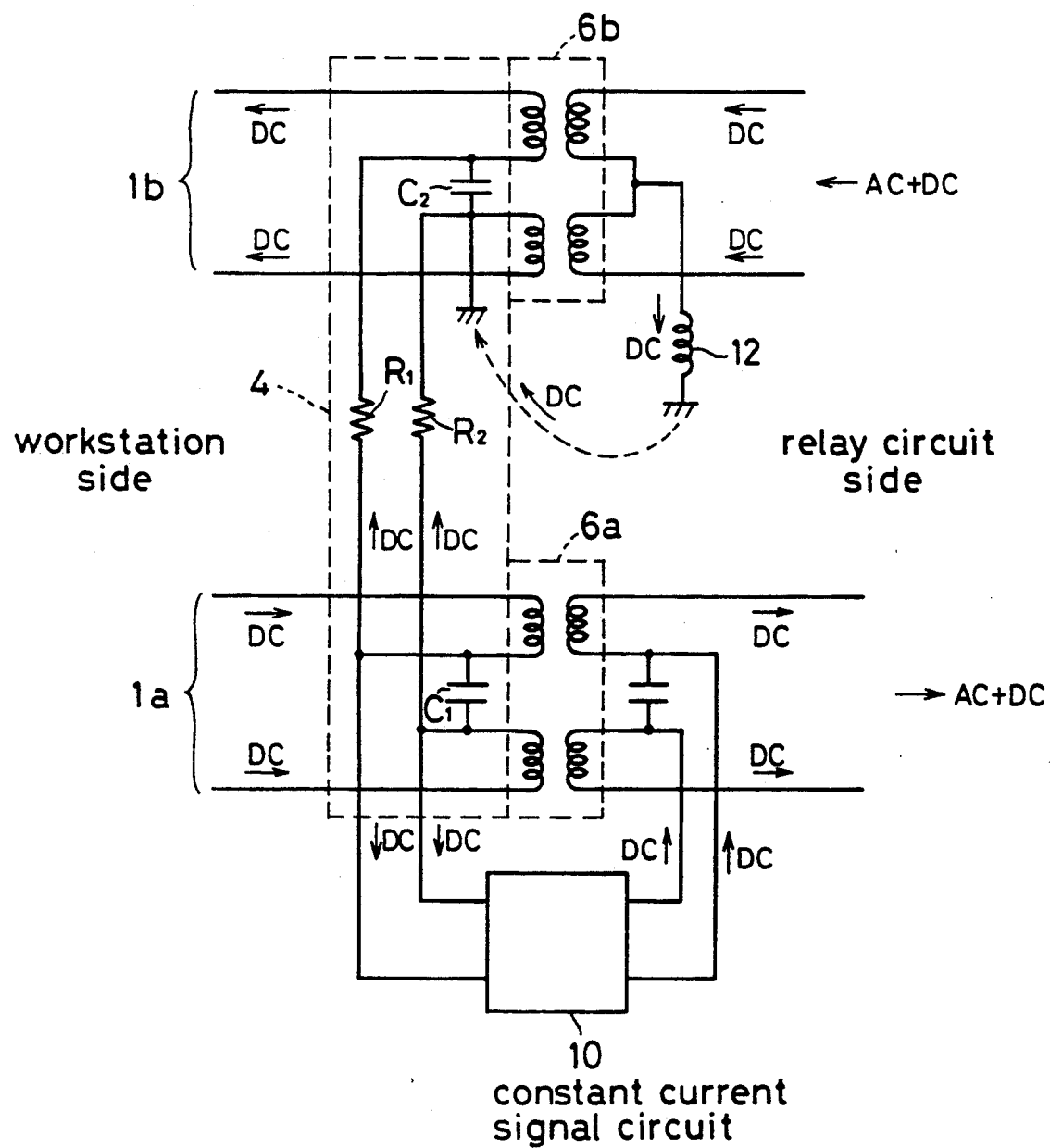
FIG. 3 shows a more detailed circuit connection of the circuit of FIG. 2.
Figure 4:
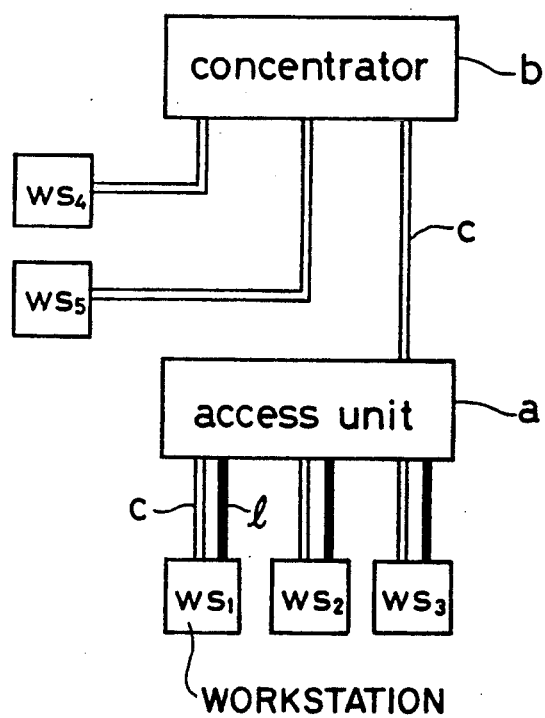
FIG. 4 shows a conventional system of a local area network with loop topology using the conventional concentrator and access unit.

FIG. 3 shows a circuit arrangement of the first and the second transformers 6a and 6b, the direct current signal extraction circuit 4, the constant current signal circuit 10, and the coil 12. Like elements corresponding to those in FIG. 2 are denoted by like numerals. In FIG. 3, the direct current signal extraction circuit 4 comprises condensers $C_1$ and $C_2$, and the resistors $R_1$ and $R_2$.

The concentrator B comprises some circuit elements for coupling the workstations ws to correspond to the connectors No.1 to No.5. Such a circuit construction of the concentrator B is the same as the circuit of FIG. 2 except the constant current signal circuit 10 and the coil 12 are excluded.

The operations of the circuits will be described when an additional workstation ws is newly coupled to one connector 1 (for example, the connector No.2 in FIG.

1) in the thus-constructed access unit A. Before the additional workstation ws is coupled to the connector 1 in the access unit A, the contact P of the relay circuit 2 is reset, so that the former-stage workstations ws and the later-stage workstations ws are directly coupled via the line within the access unit A.

Under the circumstances, when these workstation ws is coupled to the connector 1 of the access unit A, the composite signal supplied from this workstation ws is applied to the input terminal 1a. Only the DC signal from the superposed signal is extracted by the direct current extraction circuit 4 and the extracted DC signal is supplied to the condensers Cs and Cr via the diodes Ds and Dr to charge the condensers Cs and Cr. The extracted DC signal is applied to the constant current signal circuit 10 and the controller 8. A predetermined time period after the DC signal is inputted to the constant current signal circuit 10, as determined by the CR time constant circuit, the controller 8 outputs a set signal of a low level to the relay circuit 2. According to the set signal, the charge charged in the setting-purpose condenser Cs is discharged through the setting-purpose coil Rs and the controller 8, so that the contact P is set. Therefore, the workstation ws are connected to the line within the access unit A.

At the same time, the DC signal passing through the constant current circuit 10 is superposed again on the AC signal outputted from the secondary winding of the first transformer 6a, so that the thus superposed signal is forwarded to the line through the relay circuit 2. The superposed signal is forwarded to the subsequent-stage workstations ws. The superposed signal is outputted from the connector OUT for coupling to the concentrator B. At this time, when the connector OUT of the access unit A is coupled to one connector (for example, connector No.5) of the concentrator B, the relay circuit within the concentrator B is set by the DC signal in the same way as in the case of the access unit A. Therefore, the line within the access unit A is inserted into the line within the concentrator B.

On the contrary, when the workstation ws connected to one connector (for example, connector No.2 in FIG. 1) in the access unit A is disconnected, the supply of the DC signal from this workstation ws is shut off, so that the controller 8 outputs a reset signal of low level to the relay circuit 2. According to the reset signal, the charge charged in the resetting-purpose condenser Cr is discharged through the resetting-purpose coil Rr and the controller 8. Then, the contact P is reset. Thus, the workstation ws is isolated from the line.

To construct a local area network with the access unit A, in order to confirm the operation of the relay circuit 2, the workstation ws is coupled to the connector 1 to set the relay circuit 2 and, immediately, the workstation is disconnected from the connector 1. In such a case, the relay circuit 2 is reset as a result of the charge stored in the resetting-purpose condenser Cr. Thus, the relay circuit 2 is prevented from being kept set. The set and reset operations are assured.

While only certain embodiments of the present invention have been described, it will be apparent to those skilled in the art that various changes and modifications may be made therein without departing from the spirit and scope of the present invention as claimed.

All such modifications as would be obvious to one skilled in the art are intended to be included within the scope of the following claims.

What is claimed:

1. An access unit comprising:
    relay means having
        connector means,
        relay contact means for switching said connector means so that a first workstation is coupled in series between a second workstation preceding said first workstation and a third workstation subsequent said first workstation, and for switching said connector means to disconnect said first workstation so that said second workstation is directly coupled to said third workstation, and
        relay driving means for driving said relay contact means;
    first transformer means, coupled between said relay means and said first workstation, for coupling a first communication signal from said first workstation to said third workstation when said relay contact means is switched to couple said first workstation in series between said second and third workstations;
    second transformer means, coupled between said connector means and said first workstation, for coupling a second communication signal from said second workstation to said first workstation when said relay contact means is switched to couple said first workstation in series between said second and third workstations;
    direct current signal extraction means, coupled between said first workstation and said first transformer means, for extracting a dc signal from said first communication signal, said first communication signal output from said first workstation comprising said dc signal superposed on an ac data signal;
    constant current means, coupled to said direct current signal extraction means, for converting said extracted dc signal into a constant dc signal and for superposing said constant dc signal on said ac data signal output from said first transformer means;
    controller means, coupled to said direct current signal extraction means, for generating and outputting a set signal upon receipt of said extracted dc signal and a reset signal in absence of receipt of said extracted dc signal;
    condenser means, coupled to said dc signal extraction means and being charged by said extracted dc signal, for discharging the direct current to activate said relay driving means in accordance with said set and reset signals; and
    coil means, coupled between said second transformer means and said connection means, for removing a superposed dc signal from said second communication signal.

* * * * *